United States Patent
Naniwa et al.

(10) Patent No.: US 10,468,057 B2
(45) Date of Patent: Nov. 5, 2019

(54) FLEXURE AND ACTUATOR SYSTEM FOR MAGNETIC RECORDING DEVICE

(71) Applicant: Western Digital Technologies, Inc., Irvine, CA (US)

(72) Inventors: Irizo Naniwa, Fujisawa (JP); Tatsumi Tsuchiya, Hachioji (JP); Shigeo Nakamura, Odawara (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/908,338

(22) Filed: Feb. 28, 2018

(65) Prior Publication Data

US 2019/0267032 A1    Aug. 29, 2019

(51) Int. Cl.
    *G11B 5/48*    (2006.01)
(52) U.S. Cl.
    CPC .......... *G11B 5/4873* (2013.01); *G11B 5/4826* (2013.01); *G11B 5/4833* (2013.01)
(58) Field of Classification Search
    None
    See application file for complete search history.

(56) References Cited

U.S. PATENT DOCUMENTS

| | | | |
|---|---|---|---|
| 7,715,151 B2 | 5/2010 | Honda et al. | |
| 7,751,153 B1* | 7/2010 | Kulangara | G11B 5/4873 360/294.6 |
| 8,159,786 B2 | 4/2012 | Yao et al. | |
| 8,339,748 B2 | 12/2012 | Shum et al. | |
| 8,885,294 B2* | 11/2014 | Kudo | G11B 5/4873 360/99.08 |
| 8,982,513 B1* | 3/2015 | Tian | G11B 5/4833 360/245.3 |
| 9,001,469 B2* | 4/2015 | Bjorstrom | G11B 5/4873 360/244.8 |
| 9,025,285 B1 | 5/2015 | Lazatin et al. | |
| 9,047,896 B1* | 6/2015 | Kudo | G11B 5/483 |
| 9,105,288 B1* | 8/2015 | Hahn | G11B 5/4853 |
| 9,135,936 B1* | 9/2015 | Hahn | G11B 5/4853 |
| 9,224,408 B1* | 12/2015 | Hahn | G11B 5/4853 |
| 9,449,623 B2* | 9/2016 | Hagiya | H01L 41/042 |
| 10,034,388 B2* | 7/2018 | Sakakura | G11B 5/484 |
| 2001/0042794 A1* | 11/2001 | Tomkins | A01M 1/205 239/102.2 |
| 2008/0144225 A1 | 6/2008 | Yao et al. | |

(Continued)

*Primary Examiner* — William J Klimowicz
(74) *Attorney, Agent, or Firm* — Kunzler Bean & Adamson (57) ABSTRACT

A magnetic storage device comprising a magnetic disk and a carriage arm rotatably movable relative to the magnetic disk. A suspension assembly of the magnetic storage device is coupled to the carriage arm and comprising a flexure. The magnetic storage device additionally comprises a slider comprising a read-write head. The flexure comprises a fixed portion co-movably fixed relative to the carriage arm and a hinge portion to which the slider is co-movably fixed. The hinge portion is swayable relative to the fixed portion. An actuator system of the magnetic storage device is coupled to the fixed portion of the flexure and the hinge portion of the flexure. The actuator system is operable to sway the hinge portion relative to the fixed portion. The magnetic storage device includes a repolarization enhancing feature adjacent the actuator system.

21 Claims, 8 Drawing Sheets

(56) References Cited

U.S. PATENT DOCUMENTS

| | | | |
|---|---|---|---|
| 2010/0073823 A1 | 3/2010 | Aoki et al. | |
| 2014/0168814 A1* | 6/2014 | Kudo | G11B 5/4873 360/97.11 |
| 2014/0168815 A1* | 6/2014 | Kudo | G11B 5/4873 360/99.08 |
| 2016/0035968 A1* | 2/2016 | Sakakura | H01L 41/313 29/25.35 |

* cited by examiner

FLEXURE AND ACTUATOR SYSTEM FOR MAGNETIC RECORDING DEVICE

FIELD

This disclosure relates generally to magnetic storage devices, and more particularly to improving the capacitance of a piezo-electric actuator of a magnetic storage device.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include read-write heads that help facilitate storage of data on magnetic disks. Each read-write head is embedded in a slider, which supports the read-write head on a suspension assembly. Some HDDs include a suspension assembly with a flexure and an actuator coupled to the flexure. The actuator is operable to flex the flexure, which moves the slider and read-write head relative to the carriage arm. Securely mounting the actuator on the flexure without degrading the actuator can be difficult.

SUMMARY

A need exists for a magnetic storage device and a method of manufacture that securely mounts an actuator to a flexure without degrading the actuator and associated performance of the actuator. The subject matter of the present application has been developed in response to the present state of magnetic storage devices, and in particular, in response to problems and needs in the art, such as those discussed above, that have not yet been fully solved by currently available magnetic storage devices. Accordingly, the embodiments of the present disclosure overcome at least some of the shortcomings of the prior art.

Disclosed herein is a magnetic storage device. The magnetic storage device comprises a magnetic disk. The magnetic storage device also comprises a carriage arm rotatably movable relative to the magnetic disk. The magnetic storage device further comprises a suspension assembly coupled to the carriage arm and comprising a flexure. The magnetic storage device additionally comprises a slider comprising a read-write head. The flexure comprises a fixed portion co-movably fixed relative to the carriage arm and a hinge portion to which the slider is co-movably fixed. The hinge portion is swayable relative to the fixed portion. The magnetic storage device also comprises an actuator system coupled to the fixed portion of the flexure and the hinge portion of the flexure. The actuator system is operable to sway the hinge portion relative to the fixed portion and at least one of the fixed portion of the flexure comprises a repolarization enhancing feature adjacent the actuator system or the hinge portion of the flexure comprises a repolarization enhancing feature adjacent the actuator system. The preceding subject matter of this paragraph characterizes example 1 of the present disclosure.

Both the fixed portion of the flexure and the hinge portion of the flexure comprise a repolarization enhancing feature adjacent the actuator system. The preceding subject matter of this paragraph characterizes example 2 of the present disclosure, wherein example 2 also includes the subject matter according to example 1, above.

The repolarization enhancing feature comprises a buckle in the flexure. The preceding subject matter of this paragraph characterizes example 3 of the present disclosure, wherein example 3 also includes the subject matter according to any one of examples 1-2, above.

The fixed portion of the flexure comprises an electrical contact pad. The hinge portion of the flexure comprises an electrical contact pad. A gap is defined between the electrical contact pad of the fixed portion and the electrical contact pad of the hinge portion. The actuator system is mounted onto the electrical contact pad of the fixed portion, is mounted onto the electrical contact pad of the hinge portion, and spans the gap. The buckle offsets the electrical contact pad in a direction toward or away from the magnetic disk. The preceding subject matter of this paragraph characterizes example 4 of the present disclosure, wherein example 4 also includes the subject matter according to example 3, above.

The buckle comprises an angled portion of the flexure. The preceding subject matter of this paragraph characterizes example 5 of the present disclosure, wherein example 5 also includes the subject matter according to example 4, above.

The angled portion defines an angle, relative to an actuation direction of the actuation system, between 1-degree and 176-degrees. The preceding subject matter of this paragraph characterizes example 6 of the present disclosure, wherein example 6 also includes the subject matter according to example 5, above.

The repolarization enhancing feature comprises a U-shaped bend in the flexure. The preceding subject matter of this paragraph characterizes example 7 of the present disclosure, wherein example 7 also includes the subject matter according to any one of examples 1-6, above.

The U-shaped bend protrudes in a direction away from or towards the actuator system. The preceding subject matter of this paragraph characterizes example 8 of the present disclosure, wherein example 8 also includes the subject matter according to example 7, above.

The actuator system comprises a piezo-electric actuator comprising lead zirconate titanate (PZT) material. The preceding subject matter of this paragraph characterizes example 9 of the present disclosure, wherein example 9 also includes the subject matter according to any one of examples 1-8, above.

The piezo-electric actuator is coupled to the fixed portion of the flexure and the hinge portion of the flexure via corresponding solder pads. The preceding subject matter of this paragraph characterizes example 10 of the present disclosure, wherein example 10 also includes the subject matter according to example 9, above.

The solder pads are made of a solder material having a melting temperature higher than a depolarization temperature of the piezo-electric actuator. A capacitance of the PZT material of the piezo-electric actuator is a maximum possible capacitance of the PZT material. The preceding subject matter of this paragraph characterizes example 11 of the present disclosure, wherein example 11 also includes the subject matter according to example 10, above.

The fixed portion of the flexure comprises an electrical contact pad. The hinge portion of the flexure comprises an electrical contact pad. A gap is defined between the electrical contact pad of the fixed portion and the electrical contact pad of the hinge portion. The actuator system is mounted onto the electrical contact pad of the fixed portion, is mounted onto the electrical contact pad of the hinge portion, and spans the gap. The magnetic storage device further comprises encapsulation material adhered onto the fixed portion and against a fixed side of the actuator system and onto the hinge portion and against a hinge side of the actuator system, wherein the encapsulation material covers the repolarization enhancing feature. The preceding subject matter of this paragraph characterizes example 12 of the present disclosure, wherein example 12 also includes the subject matter according to any one of examples 1-11, above.

The suspension assembly further comprises a base plate fixed to the carriage arm. The suspension assembly also comprises a load beam fixed to the base plate such that the base plate is between the carriage arm and the load beam. The flexure is affixed to the base plate and the load beam. The preceding subject matter of this paragraph characterizes example 13 of the present disclosure, wherein example 13 also includes the subject matter according to any one of examples 1-12, above.

Also disclosed herein is a suspension assembly for a magnetic storage device. The suspension assembly comprises a flexure. The flexure comprises a fixed portion and a hinge portion. The hinge portion is swayable relative to the fixed portion. The carriage further comprises an actuator system coupled to the fixed portion of the flexure and the hinge portion of the flexure. The actuator system is operable to sway the hinge portion relative to the fixed portion. The fixed portion of the flexure comprises one of a buckle or a U-shaped bend immediately adjacent the actuator system. The hinge portion of the flexure comprises one of a buckle or a U-shaped bend immediately adjacent the actuator system. The preceding subject matter of this paragraph characterizes example 14 of the present disclosure.

Also disclosed herein is a method. The method comprises locating at least one piezo-electric actuator, comprising lead zirconate titanate (PZT) material, on corresponding solder pads of a fixed portion of a flexure and a hinge portion of the flexure. The fixed portion is co-movably fixed relative to a carriage arm and the hinge portion is co-movably fixed to a slider. The slider comprises a read-write head and the hinge portion is swayable relative to the fixed portion. The method also comprises heating the solder pads up to at least a melting temperature of the solder pads with the at least one piezo-electric actuator located on the solder pads. The melting temperature is higher than a depolarization temperature of the PZT material. The method further comprises after heating the solder pads up to at least the melting temperature of the solder pads and with a fixed end of the at least one piezo-electric actuator and a hinge end of the at least one piezo-electric actuator unconstrained, repolarizing the PZT material. The method additionally comprises after repolarizing the PZT material, constraining the fixed end and the hinge end of the at least one piezo-electric actuator with encapsulation material. The preceding subject matter of this paragraph characterizes example 15 of the present disclosure.

A capacitance of the PZT material before heating the solder pads is equal to the capacitance of the PZT material after repolarizing the PZT material. The preceding subject matter of this paragraph characterizes example 16 of the present disclosure, wherein example 16 also includes the subject matter according to example 15, above.

The method further comprises forming corresponding buckles in the fixed portion and the hinge portion of the flexure to be adjacent the solder pads before repolarizing the PZT material. The preceding subject matter of this paragraph characterizes example 17 of the present disclosure, wherein example 17 also includes the subject matter according to any one of examples 15-16, above.

A capacitance of the PZT material after repolarizing the PZT material is higher with the buckles formed in the fixed portion and the hinge portion than without the buckles formed in the fixed portion and the hinge portion. The preceding subject matter of this paragraph characterizes example 18 of the present disclosure, wherein example 18 also includes the subject matter according to example 17, above.

The method further comprises forming corresponding U-shaped bends in the fixed portion and the hinge portion of the flexure to be adjacent the solder pads before repolarizing the PZT material. The preceding subject matter of this paragraph characterizes example 19 of the present disclosure, wherein example 19 also includes the subject matter according to any one of examples 15-18, above.

A capacitance of the PZT material after repolarizing the PZT material is higher with the U-shaped bends formed in the fixed portion and the hinge portion than without the U-shaped bends formed in the fixed portion and the hinge portion. The preceding subject matter of this paragraph characterizes example 20 of the present disclosure, wherein example 20 also includes the subject matter according to example 19, above.

Additionally disclosed herein is a carriage for a magnetic storage device. The carriage comprises a carriage arm and the suspension assembly of example 14, above. The suspension assembly is coupled to the carriage arm. The preceding subject matter of this paragraph characterizes example 21 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
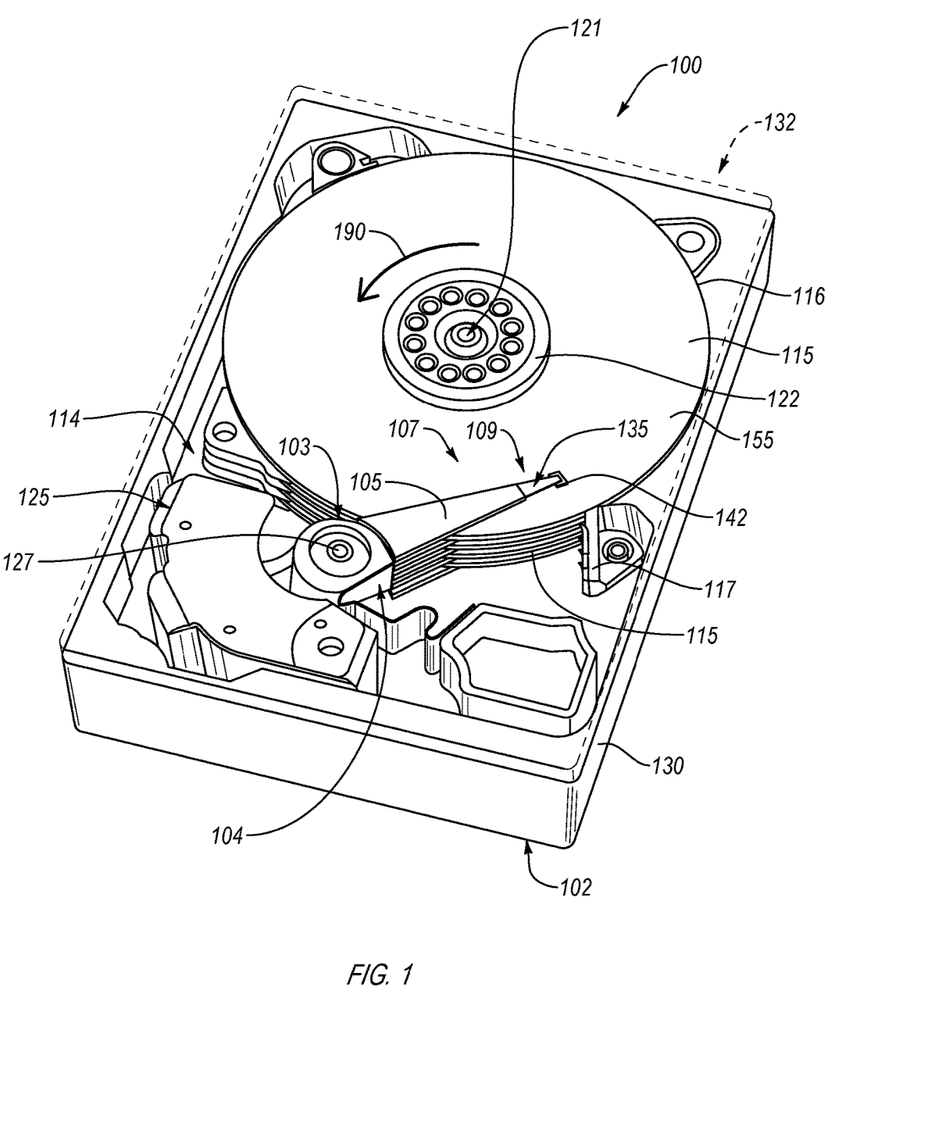
FIG. 1 is a perspective view of a magnetic storage device, according to one or more examples of the present disclosure.

Referring to FIG. 1, a magnetic storage device 100, according to one embodiment, is depicted as a hard disk drive (HDD). However, in other embodiments, the magnetic storage device 100 can be any of various magnetic storage devices without departing from the essence of the subject matter of the present disclosure. The magnetic storage device 100 includes a housing 102 that seals or encloses an interior cavity 114 defined within the housing. The housing 102 includes a base 130 and a cover 132 (shown in dashed lines so as not to obscure internal features of the magnetic storage device 100 within the interior cavity 114 of the housing 102). The cover 132 is coupled to the base 130 to enclose the interior cavity 114 from the environment exterior to the housing 102. In some implementations, a seal or gasket is positioned between the base 130 and the cover 132 to promote a seal between the base 130 and the cover 132.

The magnetic storage device 100 includes various features located within the interior cavity 114 of the housing 102. In some embodiments, the magnetic storage device 100 includes a carriage 103, disks 115, a spindle motor 121, and a voice coil motor (VCM) 125 within the interior cavity 114. The carriage 103 includes a head stack assembly 107 that includes a plurality of carriage arms 105 and at least one head-gimbal assembly 109 (e.g., suspension) coupled to the distal tip of each carriage arm of the plurality of carriage arms 105. In the illustrated embodiment of FIG. 2, only one head-gimbal assembly 109 is shown coupled to the distal tip of each carriage arm 105 of the plurality of carriage arms 105. However, it is noted that each carriage arm 105 may have another head-gimbal assembly 109 on an opposite side of the carriage arm, which mirror the head-gimbal assembly 109 shown. Each head-gimbal assembly 109 includes a suspension assembly 135 and a slider 142. The slider 142 includes at least one read-write head coupled to (e.g., embedded in) the slider 142. Although the magnetic storage device 100 in FIG. 1 is shown to have five carriage arms 105 and four disks 115, in other embodiments the magnetic storage device 100 can have fewer or more than five carriage arms 105 or fewer or more than four disks 115. In one embodiment, each side of each carriage arm 105 facing a disk 115 has a head-gimbal assembly 109 (e.g., each of bottom and top carriage arms 105 can have one head-gimbal assembly 109 and each of middle carriage arms 105, between the bottom and top carriage arms 105, can have two head-gimbal assemblies 109). Similarly, although the magnetic storage device 100 is shown to have one spindle motor 121 and one VCM 125, in other embodiments, the magnetic storage device 100 can have any number of spindle motors 121 and VCMs 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. Generally, the spindle motor 121 is operable to rotate the spindle relative to the base 130. The disks 115, or platters, are co-rotatably fixed to the spindle of the spindle motor 121 via respective hubs 122, which are co-rotatably secured to respective disks 115 and the spindle. As the spindle of the spindle motor 121 rotates, the disks 115 correspondingly rotate. In this manner, the spindle of the spindle motor 121 defines a rotational axis of each disk 115. The spindle motor 121 can be operatively controlled to rotate the disks 115, in a rotational direction 190, a controlled amount at a controlled rate.

Each of the disks 115 may be any of various types of magnetic recording media. Generally, in one embodiment, each disk 115 includes a substrate and a magnetic material applied directly or indirectly onto the substrate. For example, the magnetic material of the disks 115 may be conventional granular magnetic recording disks or wafers that have magnetic layer bits with multiple magnetic grains on each bit. In granular magnetic media, all of the bits are co-planar and the surface 116 of the disk is substantially smooth and continuous. In one embodiment, each bit has a magnetic dipole moment that can either have an in-plane (longitudinal) orientation or an out-of-plane (perpendicular) orientation.

As the disks 115 rotate in a read-write mode, the VCM 125 electromagnetically engages voice coils of the carriage arms 105 to rotate the carriage arms 105, and the head-gimbal assemblies 109, which are coupled to the carriage arms 105, relative to the disks 115 in a rotational direction along a plane parallel to read-write surfaces 155 of the disks 115. The carriage arms 105 can be rotated to position the read-write head of the head-gimbal assemblies 109 over a specified radial area of the read-write surface 155 of a corresponding disk 115 for read and/or write operations. The VCM 125 is fixed to the base 130 in engagement with the voice coils of the carriage arms 105, which are rotatably coupled to the base 130 via a spindle 127 extending through the carriage 103. Generally, the spindle 127 defines a rotational axis about which the carriage arms 105 rotate when actuated by the VCM 125.

The carriage arms 105 are non-movably fixed to (e.g., integrally formed as a one-piece unitary monolithic body with) and extend away from a base of the carriage 103 in a spaced-apart manner relative to each other. In some implementations, the carriage arms 105 are spaced an equidistance apart from each other and extend parallel relative to each other. A respective one of the disks 115 is positioned between adjacent carriage arms 105. In an idle mode (e.g., when read-write operations are not being performed), the VCM 125 is actuated to rotate the carriage arms 105, in a radially outward direction relative to the disks 15, such that the head-gimbal assemblies 109 are parked or unloaded onto a ramp support 117 secured to the base 130.

Each read-write head of the slider 142 includes at least one read transducer and at least one write transducer. The read transducer is configured to detect magnetic properties (e.g., magnetic bit patterns) of a disk 115 and convert the magnetic properties into an electrical signal. In contrast, the write transducer changes the magnetic properties of a disk 115 responsive to an electrical signal. For each head-gimbal assembly 109, the electrical signals are transmitted from and to the read-write head via electrical traces or lines 198 formed in or coupled to the slider 142 and the flexure 140 (see, e.g., FIGS. 5-7). The electrical traces of the slider 142 and the flexure 140 are electrically interconnected to facilitate transmission of electrical signals between the read-write head and a flex connector 104 of the magnetic storage device 100, which is in communication with a control module of the magnetic storage device 100 (see, e.g., FIG. 1). The control module is configured to process the electrical signals and facilitate communication of the electrical signals between the magnetic storage device 100 and one or more external computing devices. Generally, the control module includes software, firmware, and/or hardware used to control operation of the various components of the magnetic storage device 100. The control module may include a printed circuit board on or in which the hardware is mounted. As is described in more detail below, solder weldments are utilized to electrically connect corresponding electrical contact pads (and corresponding electrical traces) of the slider 142 and the flexure 140.

Although not shown, in some implementations, the head-gimbal assembly 109 also includes a head actuator selectively operable to move the read-write head relative to the hinge portion 140B of the flexure 140.

Figure 2:
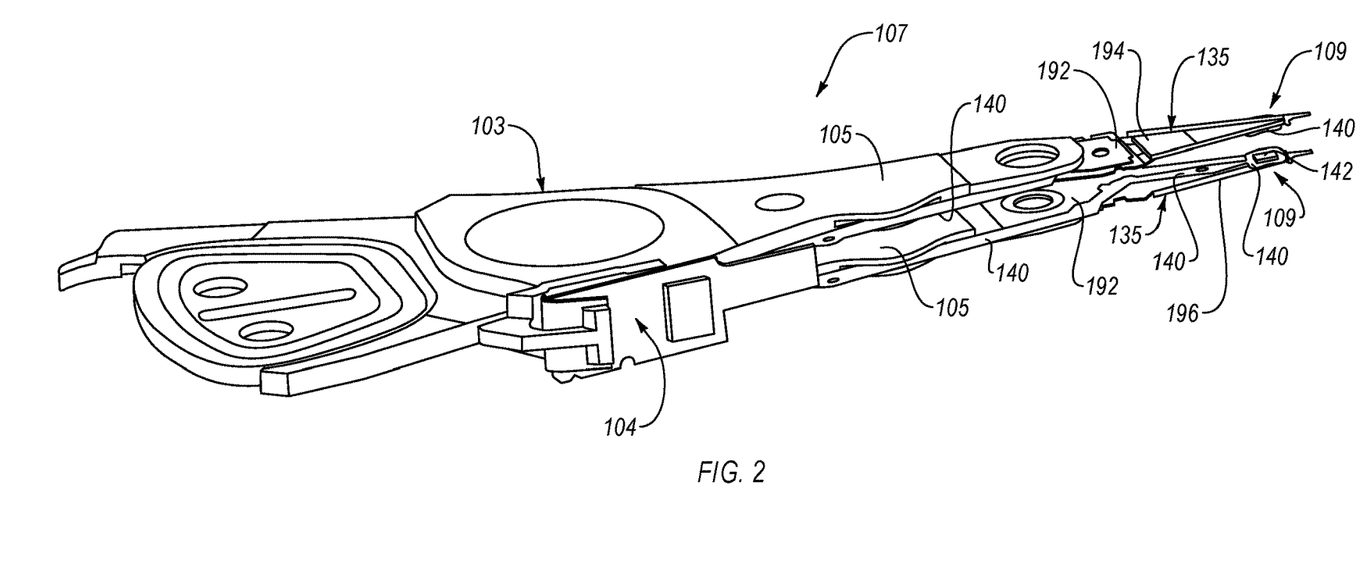
FIG. 2 is a perspective view of a head stack assembly of a magnetic storage device, according to one or more examples of the present disclosure.
Figure 3:
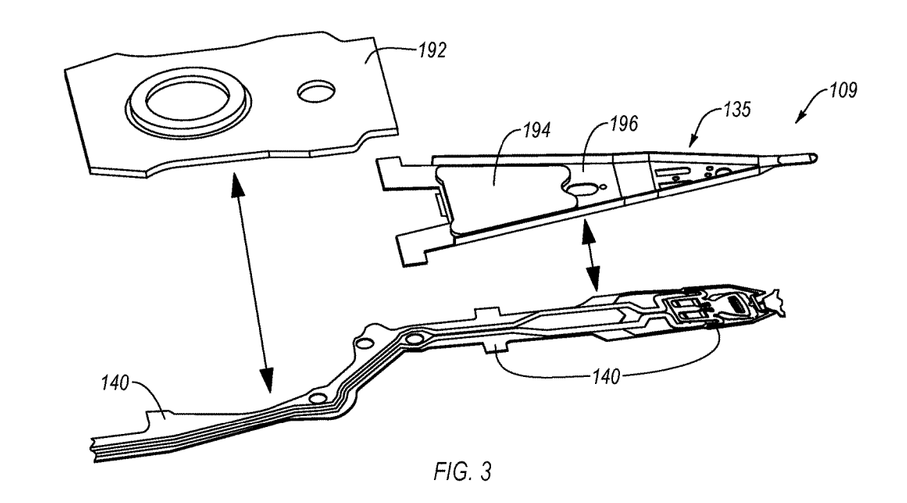
FIG. 3 is an exploded perspective view of a head-gimbal assembly of a magnetic storage device, according to one or more examples of the present disclosure.
Figure 4:
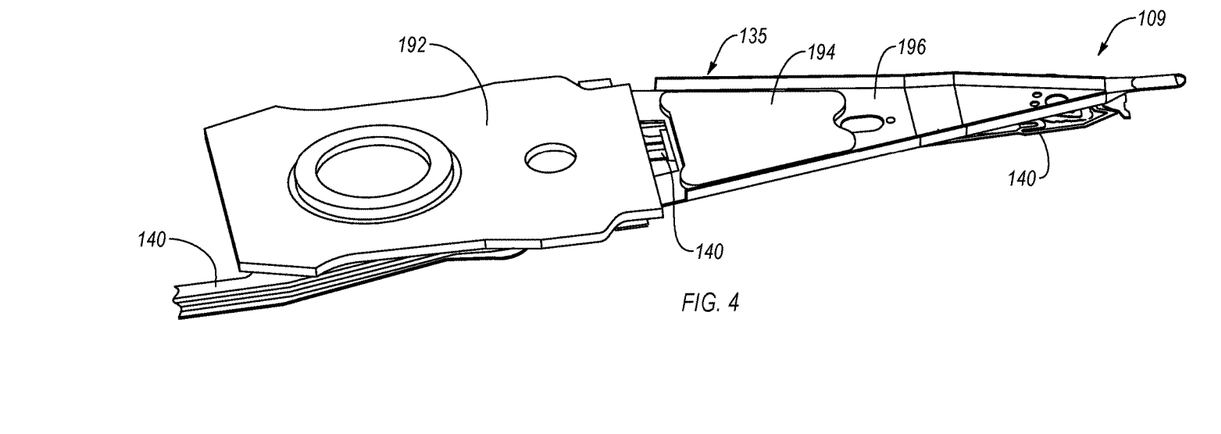
FIG. 4 is a perspective view of the head-gimbal assembly of FIG. 3, according to one or more examples of the present disclosure.
Figure 5:
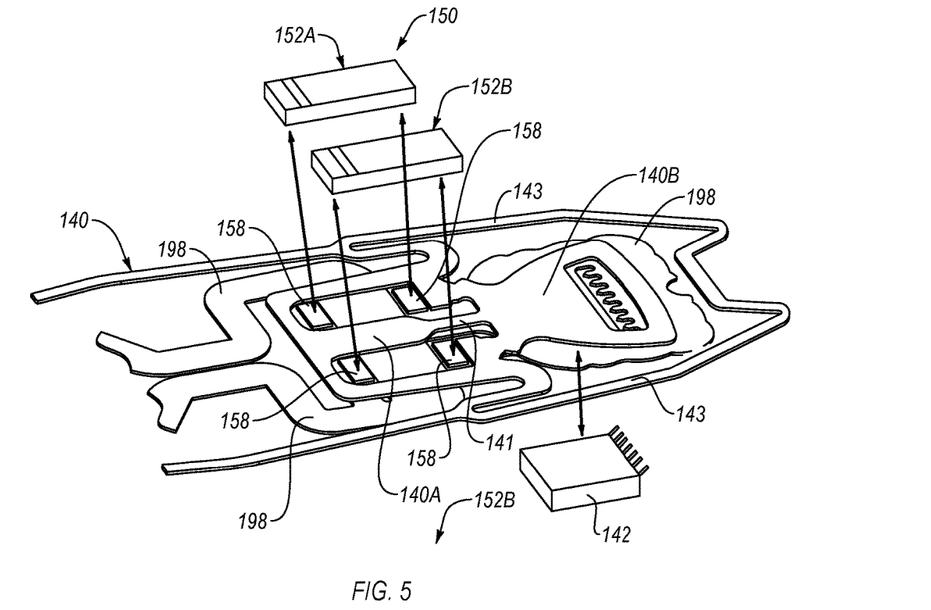
FIG. 5 is an exploded perspective view of a flexure, a slider, and actuator system of a magnetic storage device, according to one or more examples of the present disclosure.

Referring to FIGS. 2-4, the suspension assembly 135 includes a base plate 192, a load beam 196, and the flexure 140 (e.g., a tip portion of the flexure 140). The base plate 192 directly interconnects the carriage arm 105 and the load beam 196. More specifically, the base plate 192 spans between and couples together a distal end of the carriage arm 105 and the load beam 196. The load beam 196 of the suspension assembly 135 is softer and more flexible than the carriage arm 105 to resiliently support the slider 142 relative to the carriage arm 105. For example, in some implementations, the load beam 196 is flexible to flex away from the read-write surface 155 of the disk 115 to allow the slider 142 move away from the read-write surface 155 of the disk 115, such as when an air bearing is formed between the read-write surface 155 and the slider 142 as the disk 115 spins relative to the read-write head assembly 110. The load beam 196 can have a generally thin, sheet-like, construction and taper from the distal end of the carriage arm 105 to the location of the slider 142. The slider 142 is coupled to a distal end portion of the load beam 196 via a tip portion of the flexure 140. More specifically, as shown in FIGS. 3 and 5, the flexure 140 is affixed to the load beam 196 and the slider 142 is affixed to the flexure 140 (e.g., via an adhesive) such that the load beam 196 is positioned between or separates the slider 142 from the carriage arm 105. In this manner, the slider 142 is distally spaced apart from the carriage arm 105 via the load beam 196 and flexure 140 of the suspension assembly 135. The load beam 196 can be made of any of various materials, such as metals, composites, plastics, and the like. To reduce vibration of the load beam 196, the suspension assembly 135 may include a damper plate 194 mounted onto the load beam 196 (see, e.g., FIGS. 2-4).

The slider 142 of the head-gimbal assembly 109 is configured to support the read-write head at a proper flying height above the read-write surface 155. Although not shown, the slider 142 may include an air bearing surface of side rails that glide along the read-write surface 155 as the disk 115 rotates relative to the head-gimbal assembly 109. Alternatively, the slider 142 may include an air bearing surface of complex shapes, which includes shallow and deep grooves, configured to predictably position the slider 142 above the read-write surface 155 of the disk 115. The slider 142 can be made of any of various materials, such as low friction materials. For example, in one implementation, the body of the slider 142 is made of ceramics, such as, for example, aluminum oxide titanium carbide ($Al_2O_3$—TiC). In some implementations, although not shown, the slider 142 may include a thermal flying-height control (TFC) actuator to adjust the flying height of the read-write head relative to the read-write surface 155.

The flexure 140 of the suspension assembly 135 movably couples together the carriage arm 105 and the slider 142. As presented above, the flexure 140 can be separately formed and attached to the carriage arm 105, base plate 192, and load beam 196 using any of various coupling techniques, such as fastening, bonding, adhering, welding, swaging, and the like. Alternatively, the flexure 140 can be co-formed with one or more of the carriage arm 105, base plate 192, or load beam 196 to form a one-piece monolithic and unitary construction. Accordingly, the flexure 140 can be considered a portion of the carriage arm 105 and/or the suspension assembly 135. Generally, the flexure 140 enables swayable motion (e.g., rotation about axis perpendicular to read-write surfaces 155 of the disks 115) motion of the slider 142 (and read-write head) relative to the carriage arm 105.

Figure 8:
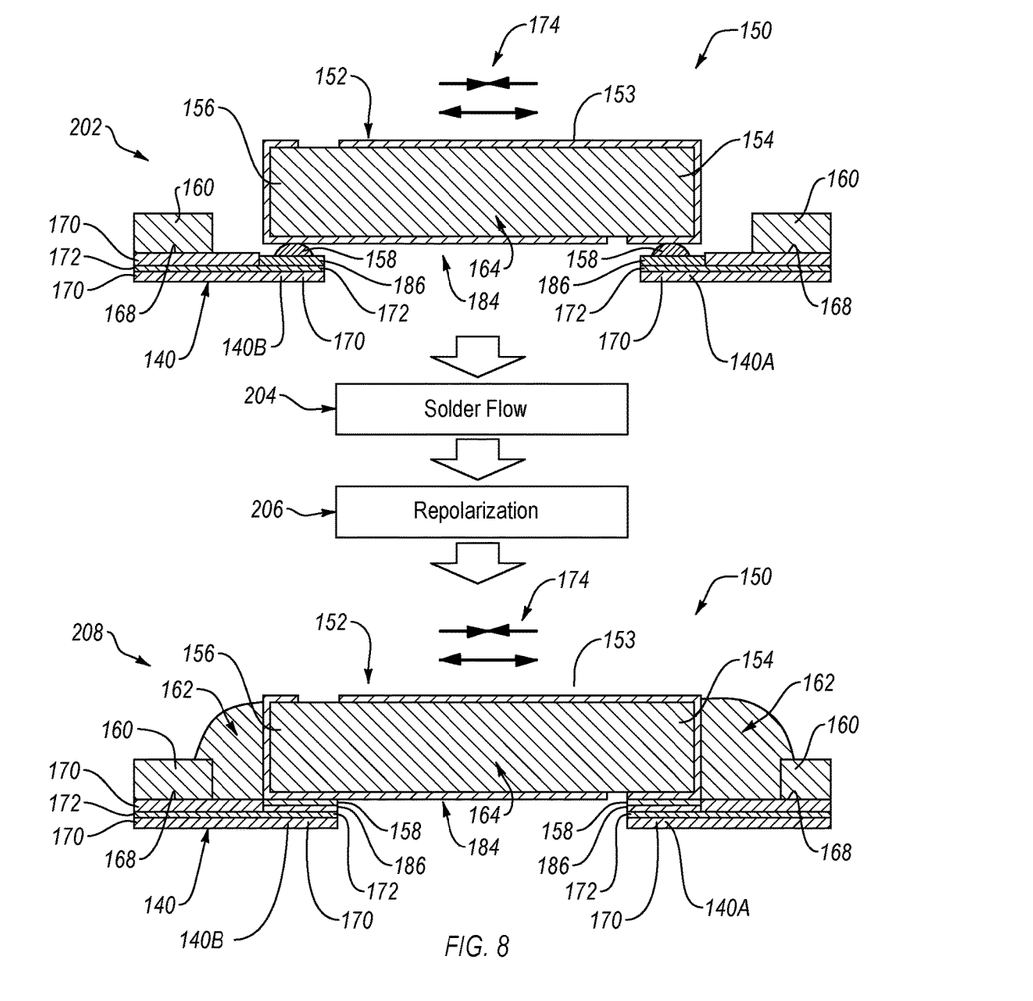
FIG. 8 is a flow chart graphically representing a method of coupling an actuator system to a flexure of a magnetic storage device, according to one or more examples of the present disclosure.
Figure 9:
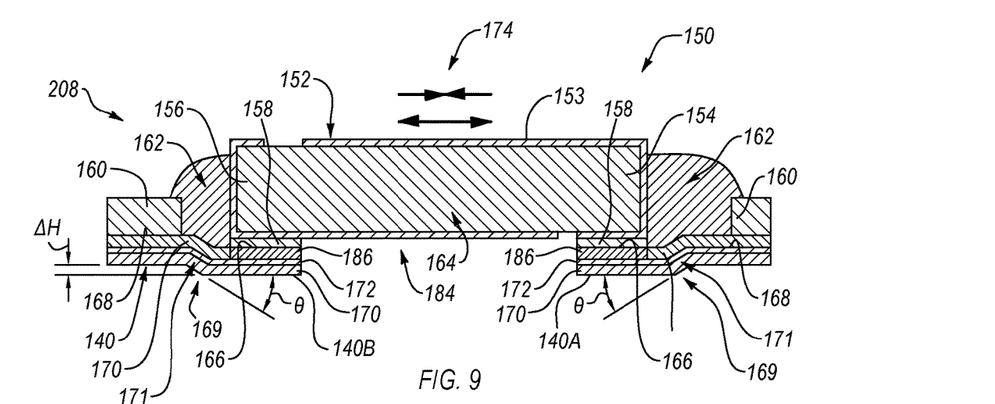
FIG. 9 is a side elevation view of a flexure and an actuator system of a magnetic storage device, according to one or more examples of the present disclosure.
Figure 10:
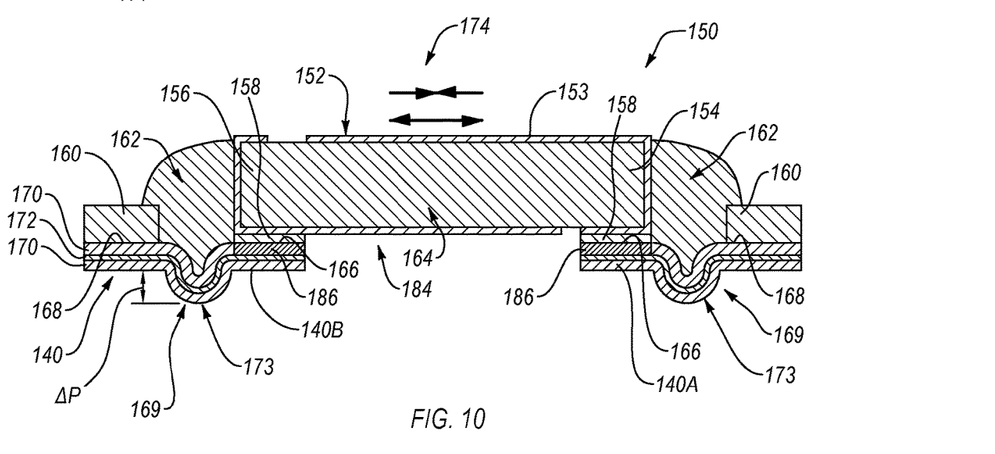
FIG. 10 is a side elevation view of a flexure and an actuator system of a magnetic storage device, according to one or more examples of the present disclosure.

The flexure 140 has a thin-walled construction such that a thickness of a wall the flexure 140 is significantly smaller than an overall width and length of the wall of the flexure 140. In one implementation, as shown in FIGS. 8-10, the flexure 140 is a laminated structure comprising several layers. For example, the flexure 140 may have a central metallic layers 172 sandwiched between two non-metallic layers 170. In such an example, each central metallic layer 172 is made of any of various metals or metal alloys, such as copper, and the non-metallic layers 170 are made of any of various non-metal materials, such as plastics (e.g., polyimides). The central metallic layer 172 acts as an electrical signal transmission line that transmits electrical power to one of the piezo-electric actuators 152 as described below. Additionally, the flexure 140 may include a base layer 160 on which the non-metallic layers 170 and central metallic layer 172 are formed via any of various techniques, such as vapor deposition, plating, photolithography, etching, etc. The base layer 160 is made of stainless steel in some implementations.

Figure 6:
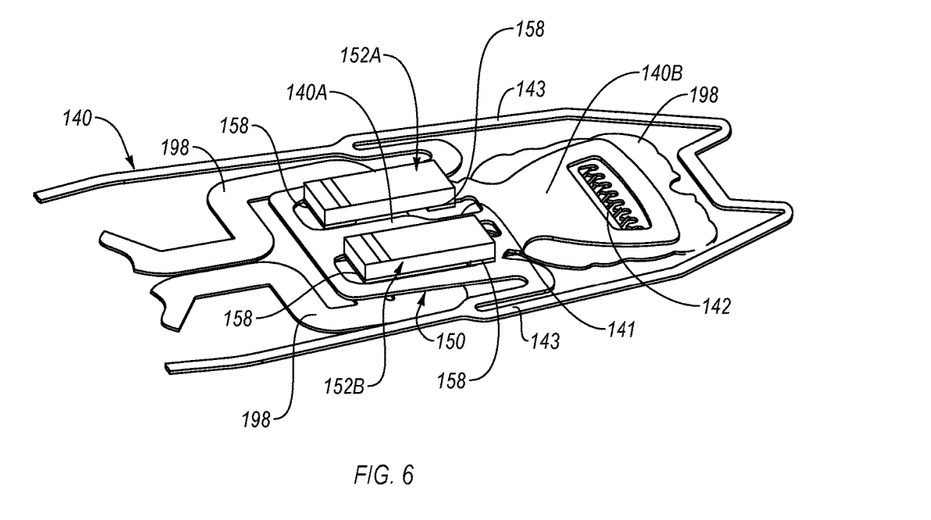
FIG. 6 is a perspective view of the flexure, slider, and actuator system of FIG. 5, according to one or more examples of the present disclosure.
Figure 7:
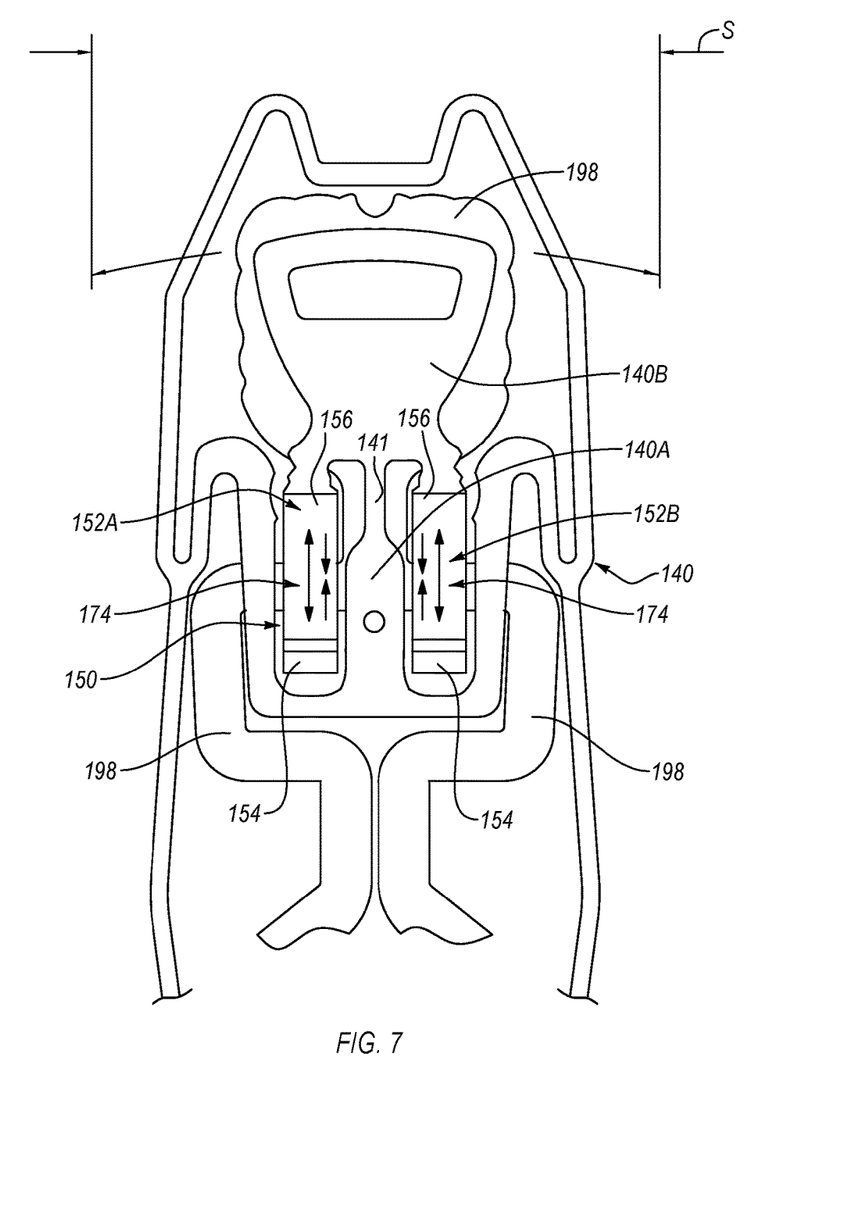
FIG. 7 is a top plan view of a flexure and actuators of a magnetic storage device, according to one or more examples of the present disclosure.

Referring to FIGS. 5-7, the flexure 140 includes a fixed portion 140A and a hinge portion 140B. The fixed portion 140A is co-movably fixed to the carriage arm 105 via the load beam 196 and the base plate 192. In contrast, the hinge portion 140B is movably fixed to the carriage arm 105 via a flexible hinge 141 between the hinge portion 140B and the fixed portion 140A. The hinge portion 140B is swayable relative to the fixed portion 140A. Accordingly, by extension, the hinge portion 140B is swayable relative to the carriage arm 105. The flexible hinge 141 is a resiliently flexible member. Generally, the flexible hinge 141 is a narrow, thin-walled portion of the flexure 140 strategically located to induce flexing at a location between the hinge portion 140B and the fixed portion 140A and thus allow swaying (e.g., rotation) of the hinge portion 140B relative to the fixed portion 140A.

Referring to FIGS. 8-10, each of the fixed portion 140A and the hinge portion 140B of the flexure 140 includes at least one electrical contact pad 186. In one implementation, the electrical contact pads 186 of the fixed portion 140A are portions of the main surface 168 of the flexure 140 contiguous with a distal edge 180 of the fixed portion 140A. Similarly, in the same implementation, the electrical contact pads 186 of the hinge portion 140B are portions of the main surface 168 of the flexure 140 contiguous with a proximal edge 182 of the hinge portion 140B. The distal edge 180 is spaced apart from the proximal edge 182 to define a gap 184 between the distal edge 180 and the proximal edge 182.

Referring to FIGS. 5-10, the carriage 103 further includes an actuator system 150. The actuator system 150 is coupled to the fixed portion 140A of the flexure 140 and the hinge portion 140B of the flexure 140. Generally, the actuator system 150 is operable to sway the hinge portion 140B relative to the fixed portion 140A. The actuator system 150 includes at least one actuator configured to move opposing portions of the actuator relative to each other. One component coupled to one of the opposing portions then moves relative to another component coupled to another of the opposing portions when the opposing portions move relative to each other.

According to one embodiment, the actuator system 150 includes two piezo-electric actuators 152 (see, e.g., left piezo-electric actuator 152A and right piezo-electric actuator 152B of FIGS. 5-7). Referring to FIG. 8, each of the piezo-electric actuators 152 includes electrodes 153 and lead zirconate titanate (PZT) material 164 to which the electrodes 153 are coupled. Each of the piezo-electric actuators 152 includes a fixed end 154 and a hinge end 156, opposite the fixed end 154. The fixed end 154 of each piezo-electric actuator 152 is non-movably fixed to an electrical contact pad 186 on a corresponding central metallic layer 172 or electrical line of the fixed portion 140A. Similarly, the hinge end 156 of each piezo-electric actuator 152 is non-movably fixed to an electrical contact pad 186 of a corresponding central metallic layer 172 of the hinge portion 140B. The electrical contact pads 186 can be made of any of various electrically-conductive materials, such as gold and copper. The two electrical contact pads 186 and electrical contact pads 186 on the fixed portion 140A are spaced apart and the two electrical contact pads 186 and electrical contact pads 186 on the hinge portion 140B are spaced apart. Accordingly, when fixed to the electrical contact pads 186, the piezo-electric actuators 152 are also spaced apart and span the gap 184 between the distal edge 180 and the proximal edge 182.

As shown in FIG. 8, the piezo-electric actuators 152 are coupled or mounted to corresponding electrical contact pads 186 by corresponding solder pads 158. More specifically, each of the fixed ends 154 and hinge ends 156 of the piezo-electric actuators 152 is non-movably fixed to a corresponding electrical contact pad 186 via separate solder pad 158. Each solder pad 158 includes a layer of solder material, such as a paste formed of an alloy of lead and tin. Solder material is defined herein as a metal or metal alloy that is flowable at or above a melting temperature and hardens below the melting temperature. Ag (silver) paste is not considered solder material because Ag paste may be incapable of providing a sufficiently reliable and secure mounting of an actuator 152 to the flexure 140. For example, Ag paste may induce electro-chemical migration (e.g., ion migration), which can cause short circuit failures. Accordingly, the solder pads 158 can provide superior hold and retention properties over Ag paste. Additionally, the solder material of the solder pads 158 facilitates self-alignment between the electrical contact pads 186 and the electrodes 153 of the piezo-electric actuators 152 during the reflow process in some implementations.

The piezo-electric actuator 152 (also identifiable as a piezo-electric micro-actuators or milli-actuators) utilizes the properties of the PZT material 164 to precisely and responsively control movement of the hinge end 156 relative to the fixed end 154. As defined herein, the PZT material 164 is any solid material that deforms when subject to an electric charge. In other words, the PZT material 164 is capable of changing dimensions to generate a force or load when an electric field is applied to the material. Accordingly, the piezo-electric actuators 152 actuate in response to the receipt of an electrical load. Generally, the deformation or actuation of a piezo-electric actuator 152 is directly proportional to the electrical charge applied to the piezo-electric actuator 152. Accordingly, the piezo-electric actuator 152 is able to deform or actuate with controlled characteristics. In some implementations, the piezo-electric actuators 152 are cooperatively actuated (e.g., retracted or expanded as shown) opposite each other to sway the slider 142 and the read-write head as shown by directional arrows in FIG. 7. For example, referring to FIG. 7, when the left piezo-electric actuator 152A is retracted (to draw the hinge end 156 towards the fixed end 154) and the right piezo-electric actuator 152B is expanded (to more the hinge end 156 away from the fixed end 154), the slider 142 rotates to the left. In contrast, when the right piezo-electric actuator 152B is retracted and the left piezo-electric actuator 152A is expanded, the slider 142 rotates to the right.

The actuator system 150 further includes encapsulation material 162 at the fixed end 154 and the hinge end 156 of each of the piezo-electric actuators 152. The encapsulation material 162 adheres to the fixed end 154 and the hinge end 156 of the piezo-electric actuators 152. Additionally, the encapsulation material 162 adheres onto the main surface 168 of the fixed portion 140A and the hinge portion 140B of the flexure 140 at locations adjacent the ends of the piezo-electric actuators 152. In this configuration, the encapsulation material 162 helps to constrain movement of the ends of the piezo-electric actuators 152 relative to the main surface 168 of the flexure 140. The encapsulation material 162 also at least partially covers the base layer 160 of the flexure 140 in some implementations and may at least partially cover a top of the piezo-electric actuators 152 in certain implementations.

The full range of sway or rotational motion of the hinge portion 140B or the slider 142 provided by the piezo-electric actuators 152 is defined as the stroke (S) (see, e.g., FIG. 7). Generally, the larger the stroke the higher the performance of the magnetic storage device 100. The stroke is largely dependent on (e.g., proportional to) the capacitance of the piezo-electric actuators 152. In other words, the larger the capacitance, the larger the stroke. For example, when the actual capacitance of the PZT material 164 of the piezo-electric actuators 152 is at or near a maximum possible capacitance of the PZT material 164, then the stroke of the hinge portion 140B or the slider 142 achieved by the piezo-electric actuators 152 also is at or near a maximum possible stroke.

The capacitance of the PZT material 164 is generally proportional to the level of polarization of the PZT material 164. For example, the higher the polarization of the PZT material 164, the higher the capacitance of the PZT material 164 and vice versa. Depolarization of the PZT material 164 can be caused by heating the PZT material to a temperature at or beyond a depolarization temperature of the PZT material 164.

Often, the depolarization temperature of the PZT material 164 is lower than the melting temperature of the solder material of the solder pads 158. Accordingly, when the solder pads 158 are melted during a reflow process to secure the piezo-electric actuators 152 to the flexure 140, the PZT material 164 can be depolarized, thus reducing its capacitance. To increase the capacitance of the PZT material 164 after reflowing the solder pads 158, the PZT material 164 can be repolarized by applying a constant external electric field to the PZT material 164. However, when the ends of the piezo-electric actuators 152 are constrained by the encapsulation material 162, the PZT material 164 may only partially repolarize, thus resulting in a capacitance of the PZT material 164 that is much less than the maximum possible capacitance of the PZT material 164. Moreover, repolarizing the PZT material 164 when the ends of the piezo-electric actuators 152 are constrained by the encapsulation material 162 may induces stresses in and cause damage to the PZT material 164, which may result in underperformance and/or reliability issues with the piezo-electric actuators 152. It is noted that solder materials with a melting temperature lower than the depolarization temperature of the PZT material 164, while potentially avoiding depolarization of the PZT material 164, would not provide a sufficiently reliable and secure mounting of an actuator 152 to the flexure 140 for many applications.

Figure 11:
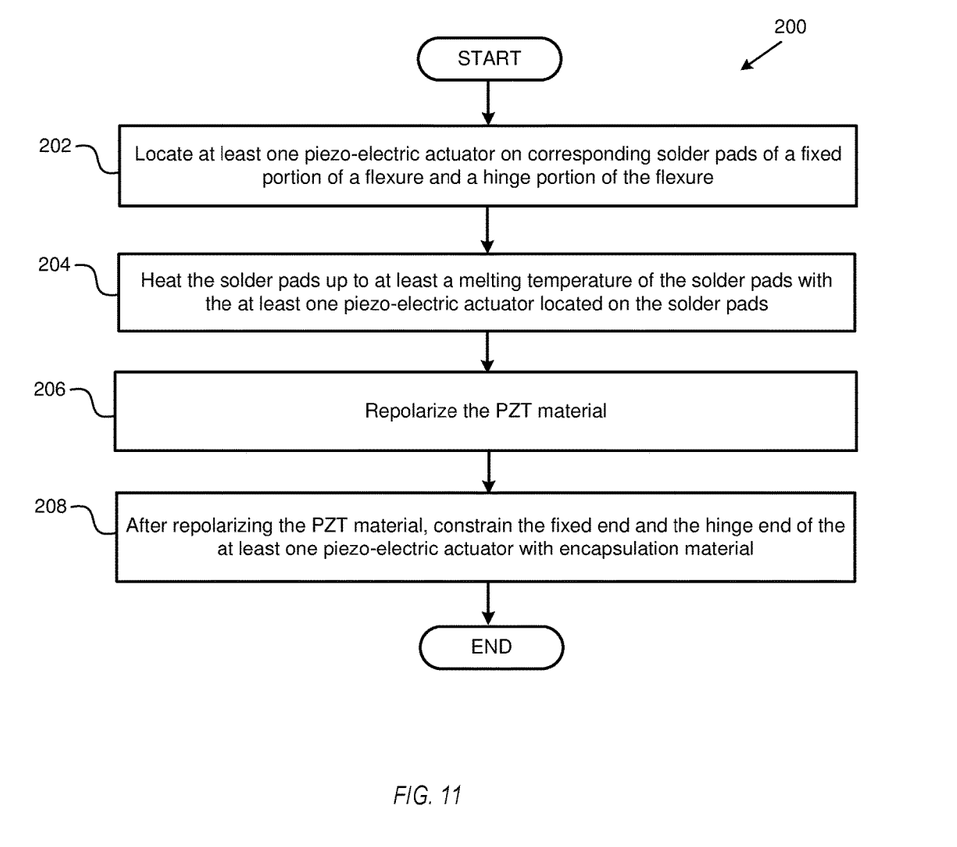
FIG. 11 is a schematic flow chart of a method of making a magnetic storage device, according to one or more examples of the present disclosure.

Referring to FIGS. 8 and 11, according to one method 200, application of the encapsulation material 162 to constrain the ends of the piezo-electric actuators 152 is delayed until after repolarization of the PZT material 164. The method 200 begins by locating at least one piezo-electric actuator 152 (e.g., two piezo-electric actuators 152 in the illustrated embodiment) on corresponding solder pads 158 (in a pre-formed state) of a fixed portion 140A of a flexure 140 and a hinge portion 140B of the flexure 140 at 202. The solder pads 158, prior to reflow of the solder pads 158, act to initially couple the piezo-electric actuators 152 to the electrical contact pads 186. The method 200 further includes heating the solder pads 158 up to at least a melting temperature of the solder material of the solder pads 158, with the at least one piezo-electric actuator 152 located on the solder pads 158, at 204. As mentioned above, heating the solder pads 158 at 204 acts to reflow the solder pads 158, which fully forms the solder pads 158 and helps to more reliably and strongly retain the at least one piezo-electric actuator 152 on the solder pads 158 after the solder pads 158 are allowed to cool and harden.

The type of solder material providing the level of retention desired may have a melting temperature higher than the depolarization temperature of the PZT material 164 of the at least one piezo-electric actuator 152. Accordingly, heating the solder pads 158 at 204 may also depolarize the PZT material 164. For this reason, the method 200 includes repolarizing the PZT material 164 of the at least one piezo-electric actuator 152, after heating the solder pads 158 up to at least the melting temperature of the solder pads 158, at 206. The PZT material 164 is repolarized at 206 while the fixed end 154 of the at least one piezo-electric actuator 152 and the hinge end 156 of the at least one piezo-electric actuator 152 is unconstrained. In other words, the PZT material 164 is repolarized at 206 before encapsulation material 162 is affixed to the fixed end 154 and the hinge end 156 of the at least one piezo-electric actuator 152.

The method 200 further includes, after repolarizing the PZT material 164 at 206, constraining the fixed end 154 and the hinge end 156 of the at least one piezo-electric actuator 152 with encapsulation material 162. Constraining the fixed end 154 and the hinge end 156 of the at least one piezo-electric actuator 152 with encapsulation material 162 at 208 can include applying the encapsulation material 162, while in a flowable state, onto the ends of the actuator and the main surface 168 of the flexure 140 and allowing the encapsulation material 162 to harden or set. In one implementation, the encapsulation material 162 is a thermoplastic or thermoset material, such as an ultra-violet adhesive, acrylic, or other epoxy/resin. At least partially because the at least one piezo-electric actuator 152 is unconstrained when the PZT material 164 is repolarized, the PZT material 164 is able to achieve a full or nearly full polarization, which allows the PZT material 164 to have a capacitance, after the solder pads 158 are reflowed and after the PZT material 164 is repolarized, that is substantially equal to the capacitance of the PZT material 164 before the solder pads 158 are reflowed. Generally, the capacitance of the PZT material 164 before the solder pads 158 are reflowed is defined as the maximum possible capacitance of the PZT material 164.

Referring to FIGS. 9 and 10, in some embodiments, the flexure 140 includes repolarization enhancing features 169 adjacent the actuator system 150 that promote or enhance repolarization of the PZT material 164 during the repolarization of the PZT material 164 at 206 of the method 200. Generally, the repolarization enhancing features 169 promote a higher capacitance of the PZT material 164 after repolarizing the PZT material 164 at 206 than without the repolarization enhancing features 169 (i.e., if the flexure 140 did not include the repolarization enhancing features 169). In some embodiments, a repolarization enhancing feature 169 is a feature formed into the flexure 140 adjacent (e.g., immediately adjacent) an end of a piezo-electric actuator 152 and thus adjacent. In certain implementations, the repolarization enhancing feature 169 is a bent, angled, or deformed portion of the wall of the flexure 140 adjacent (e.g., immediately adjacent) an electrical contact pad 186. In one implementation, the flexure 140 includes a repolarization enhancing feature 169 adjacent each one of the electrical contact pads 186. Accordingly, in one implementation, the flexure 140 may include four repolarization enhancing features 169 for the four electrical contact pads 186 that support the two piezo-electric actuators 152.

The repolarization enhancing features 169 act as localized spring-like elements that promote localized flexing of the flexure 140 as the piezo-electric actuators 152 deform during repolarization. More specifically, the repolarization enhancing features 169 relax the stress which is applied to the piezo-electric actuators 152 by the deformation, and the repolarization is enhanced. Furthermore, the localized spring-like elements of the repolarization enhancing features 169 reduce the risk of cracking of the piezo-electric actuators 152 by thermal deformation in the reflow and cooling processes, as well as the deformation that occurs in the repolarization process. In one implementation of the method 200, constraining the ends of the piezo-electric actuators 152 with encapsulation material 162 includes applying encapsulation material 162 onto the repolarization enhancing features 169 of the flexure 140.

As shown in FIG. 9, in one embodiment, the repolarization enhancing feature 169 is a buckle 171 in the wall of the flexure 140. The buckle 171 includes an angled portion of the flexure 140 between the corresponding electrical contact pad 186 and the main surface 168. Generally, the buckle 171 offsets the corresponding electrical contact pad 186 in a direction toward or away from the magnetic disk 115 such that the electrical contact pad 186 is offset a distance ΔH relative to the main surface 168. The distance ΔH is selected such that the buckle 171 does not extend beyond the slider 142. From the perspective of FIG. 9, the buckle 171 locates the electrical contact pad 186 below the main surface 168 while allowing the electrical contact pad 186 to be parallel with the main surface 168. The angled portion of the flexure 140 can define an angle θ, relative to the actuation direction of the piezo-electric actuator 152 of the actuator system 150, that is between about 1-degree and about 179-degrees in one implementation and between about 20-degrees and about 90-degrees in another implementation. Although the angled portion of the buckle 171 is planar in the illustrated embodiment, in other embodiments, the angled portion of the buckle 171 can be curved.

As shown in FIG. 10, in one embodiment, the repolarization enhancing feature 169 is a U-shaped bend 173 in the wall of the flexure 140 positioned between the corresponding electrical contact pad 186 and the main surface 168. The U-shaped bend 173 protrudes in a direction away from (as shown) or towards the corresponding piezo-electric actuator 152 of the actuator system 150. From the perspective of FIG. 10, the U-shaped bend 173 protrudes below the main surface 168 a distance ΔP. The distance ΔP is selected such that the U-shaped bend 173 does not extend beyond the slider 142. The U-shaped bend 173 allows the electrical contact pad 186 to be co-planar with the main surface 168. Although the protrusion of the U-shaped bend 173 is curved (e.g., defines a substantially semi-circular shape) in the illustrated embodiment, in other embodiments, the U-shaped bend 173 can include planar surfaces sharply angled relative to each other. The U-shaped bend 173 in effect defines a recess in the main surface 168 of the flexure 140.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A magnetic storage device, comprising:
    a magnetic disk;
    a carriage arm rotatably movable relative to the magnetic disk;
    a suspension assembly coupled to the carriage arm and comprising a flexure;
    a slider comprising a read-write head, wherein:
    the flexure comprises a fixed portion co-movably fixed relative to the carriage arm and a hinge portion to which the slider is co-movably fixed; and
    the hinge portion is swayable relative to the fixed portion; and
    an actuator system coupled to the fixed portion of the flexure and the hinge portion of the flexure, wherein:
        the actuator system is operable to sway the hinge portion relative to the fixed portion;
        at least one of:
            the fixed portion of the flexure comprises a repolarization enhancing feature adjacent the actuator system; or
            the hinge portion of the flexure comprises a repolarization enhancing feature adjacent the actuator system; and
        each repolarization enhancing feature comprises a spring element that promotes localized flexing of the flexure in response to the actuator system deforming during a repolarization process.

2. The magnetic storage device according to claim 1, wherein both the fixed portion of the flexure and the hinge portion of the flexure comprise a repolarization enhancing feature adjacent the actuator system.

3. The magnetic storage device according to claim 1, wherein the spring element comprises a buckle in the flexure.

4. The magnetic storage device according to claim 3, wherein:
    the fixed portion of the flexure comprises an electrical contact pad;
    the hinge portion of the flexure comprises an electrical contact pad;
    a gap is defined between the electrical contact pad of the fixed portion and the electrical contact pad of the hinge portion;
    the actuator system is mounted onto the electrical contact pad of the fixed portion, is mounted onto the electrical contact pad of the hinge portion, and spans the gap; and
    the buckle offsets the electrical contact pad in a direction toward or away from the magnetic disk.

5. The magnetic storage device according to claim 4, wherein the buckle comprises an angled portion of the flexure.

6. The magnetic storage device according to claim 5, wherein the angled portion defines an angle, relative to an actuation direction of the actuator system, between 1-degree and 176-degrees.

7. The magnetic storage device according to claim 1, wherein the actuator system comprises a piezo-electric actuator comprising lead zirconate titanate (PZT) material.

8. The magnetic storage device according to claim 7, wherein the piezo-electric actuator is coupled to the fixed portion of the flexure and the hinge portion of the flexure via corresponding solder pads.

9. The magnetic storage device according to claim 8, wherein:
    the solder pads are made of a solder material having a melting temperature higher than a depolarization temperature of the piezo-electric actuator; and
    a capacitance of the PZT material of the piezo-electric actuator is a maximum possible capacitance of the PZT material.

10. The magnetic storage device according to claim 1, wherein:
    the fixed portion of the flexure comprises an electrical contact pad;
    the hinge portion of the flexure comprises an electrical contact pad;
    a gap is defined between the electrical contact pad of the fixed portion and the electrical contact pad of the hinge portion;
    the actuator system is mounted onto the electrical contact pad of the fixed portion, is mounted onto the electrical contact pad of the hinge portion, and spans the gap; and
    the magnetic storage device further comprises encapsulation material adhered onto the fixed portion and against a fixed side of the actuator system and onto the hinge portion and against a hinge side of the actuator system, wherein the encapsulation material covers the repolarization enhancing feature.

11. The magnetic storage device according to claim 1, wherein the suspension assembly further comprises:
    a base plate fixed to the carriage arm; and
    a load beam fixed to the base plate such that the base plate is between the carriage arm and the load beam;
    wherein the flexure is affixed to the base plate and the load beam.

12. The magnetic storage device according to claim 1, wherein:
    the spring element of the fixed portion is located at a first end of the actuator system; and
    the spring element of the hinge portion is located at a second end of the actuator system that is distally opposite the first end.

13. The magnetic storage device according to claim 12, wherein the spring element is configured to relax a stress applied to the actuator system during the repolarization process.

14. The magnetic storage device according to claim 13, wherein the spring element is further configured to thermally insulate the actuator system during reflow and cooling processes.

15. The magnetic storage device according to claim 1, wherein the spring element is configured to relax a stress applied to the actuator system during the repolarization process.

16. The magnetic storage device according to claim 15, wherein the spring element is further configured to thermally insulate the actuator system during reflow and cooling processes.

17. The magnetic storage device according to claim 1, wherein the spring element is further configured to thermally insulate the actuator system during reflow and cooling processes.

18. A suspension assembly for a magnetic storage device, the suspension assembly comprising:
   a flexure comprising a fixed portion, a hinge portion, and repolarization enhancing features, wherein the hinge portion is swayable relative to the fixed portion; and
   an actuator system coupled to the fixed portion of the flexure and the hinge portion of the flexure,
   wherein:
      the actuator system is operable to sway the hinge portion relative to the fixed portion;
      each repolarization enhancing feature comprises a spring element that promotes localized flexing of the flexure in response to the actuator system deforming during a repolarization process;
      the fixed portion of the flexure comprises one of the repolarization enhancing features, wherein the spring element of the repolarization enhancing feature of the fixed portion comprises one of a buckle or a U-shaped bend immediately adjacent the actuator system; and
      the hinge portion of the flexure comprises another one of the repolarization enhancing features, wherein the spring element of the repolarization enhancing feature of the hinge portion comprises one of a buckle or a U-shaped bend immediately adjacent the actuator system.

19. A carriage for a magnetic storage device, the carriage comprising:
   a carriage arm; and
   the suspension assembly of claim 18 coupled to the carriage arm.

20. The suspension assembly according to claim 18, wherein the one of the buckle or the U-shaped bend is configured to relax a stress applied to the actuator system during the repolarization process.

21. The suspension assembly according to claim 18, wherein the one of the buckle or the U-shaped bend is configured to thermally insulate the actuator system during reflow and cooling processes.

* * * * *